United States Patent [19]

Lynch et al.

[11] Patent Number: 4,844,580
[45] Date of Patent: Jul. 4, 1989

[54] FIBER OPTIC LENS

[75] Inventors: Thomas Lynch, Williamsport; Rudolph A. Montgelas, Lock Haven, both of Pa.

[73] Assignee: GTE Products Corporation, Stamford, Conn.

[21] Appl. No.: 194,662

[22] Filed: May 16, 1988

[51] Int. Cl.$^4$ ............... G01K 1/16; G02B 6/00; G02B 5/14

[52] U.S. Cl. .................... 350/96.18; 65/108; 350/320

[58] Field of Search ............ 350/96.18, 96.20, 416, 350/433, 434; 65/108, 109, 292, 279, 299

[56] References Cited

U.S. PATENT DOCUMENTS

| | | | |
|---|---|---|---|
| 3,183,721 | 5/1965 | Kaynan | 65/108 |
| 3,379,217 | 4/1968 | Leonard | 65/108 |
| 3,393,988 | 7/1968 | Blumenthal | 65/108 |
| 3,537,833 | 11/1970 | Gossie et al. | 65/109 |
| 4,193,663 | 3/1980 | Timmermann | 350/96.18 |
| 4,265,511 | 5/1981 | Nicia et al. | 350/96.18 |
| 4,265,699 | 5/1981 | Ladany | 156/657 |
| 4,269,648 | 5/1981 | Dakss | 156/293 |
| 4,290,667 | 9/1981 | Chown | 350/96.18 |
| 4,304,461 | 12/1981 | Stewart et al. | 350/96.18 |
| 4,327,963 | 5/1982 | Khoe et al. | 350/96.18 |
| 4,370,021 | 1/1983 | Khoe et al. | 350/96.18 |
| 4,380,365 | 4/1983 | Gross | 350/96.18 |
| 4,456,330 | 6/1984 | Blüdaü | 350/96.18 |
| 4,497,536 | 5/1985 | Payne et al. | 350/96.21 |
| 4,655,609 | 4/1987 | Alber | 65/109 X |
| 4,671,609 | 6/1987 | Khoe et al. | 350/96.18 |
| 4,678,268 | 7/1987 | Russo et al. | 350/96.18 |
| 4,687,285 | 8/1987 | Hily et al. | 350/96.18 |
| 4,691,985 | 9/1987 | Shank et al. | 350/96.18 |
| 4,693,556 | 9/1987 | McGaughan, Jr. | 350/96.20 X |

Primary Examiner—William L. Sikes
Assistant Examiner—Akm E. Ullah
Attorney, Agent, or Firm—William H. McNeill

[57] ABSTRACT

A lens for an optical fiber is formed on the end of a capillary glass tube which is then fitted over an optical fiber. The lens can be formed by mounting a capillary tube in a spindle, and rotating and heating the end of the tube until centrifugal force forms the lens as a bulbous portion.

7 Claims, 7 Drawing Sheets

FIBER OPTIC LENS

TECHNICAL FIELD

This invention relates to fiber optic accessories and more particularly to an expanded beam lens for an optical fiber.

BACKGROUND ART

Optical fibers are finding increasing use in telecommunications as well as in other date transmission systems because of their ability to carry vastly more information than equivalent sizes of electrical wire. Connecting two or more optical fibers, however, requires much more care than equivalent electrical connections since the fibers must be optically aligned. Many forms of optical connectors have been proposed to achieve the direct compatibility of such connections, and include butt-to-butt joints of cleaved and polished fibers, and expanded beam lenses.

This invention is particularly concerned with improving the latter. Such expanded beam lenses are shown in, i.e., U.S. Pat. Nos. 4,691,985; 4,671,609; 4,678,268; 4,687,285; 4,693,556; 4,456,330; 4,497,536; 4,380,365; 4,327,963; 4,370,021; 4,304,461; 4,290,667; 4,269,648; 4,265,699; 4,265,511; and 4,193,633.

The lenses shown can be broken down into three basic types, viz: add-on lenses that are slipped over the end of a fiber; spherical lenses that are cemented to a fiber end; and lenses formed by deformation of the fiber end itself.

While all of these techniques have been employed with greater of lesser degrees of success, all have some problems, such as difficulty of field use, high cost or lack of consistent performance. Plastic lenses have suffered because of their different thermal expansion coefficients when compared with glass.

This invention is particularly concerned with add-on lenses.

SUMMARY OF THE INVENTION

It is, therefore, an object of this invention to enhance optical fiber connections.

It is another object of this invention to enhance fiber optic lenses.

It is yet another object of the invention to provide an inexpensive glass lens.

Still another object of the invention is the provision of a method of making the improved lens.

These objects are accomplished, in one aspect of the invention, by the provision of a lens for an optical fiber which lens comprises an elongated, capillary, glass tube having a longitudinally located, fiber receiving bore terminating in an integral, bulbous portion.

The lens is fabricated by forming an elongate, glass capillary tube and mounting the tube in a spindle. The spindle is rotated and one end of the tube is heated to melt the glass and form a bulbous portion.

Lenses so formed have a coefficient of expansion closely matching the fiber and are economical to manufacture. The employment of the capillary tubing provides a close fit with the fiber, yet allows index matching fluid to be drawn therein to fix the fiber to the lens.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
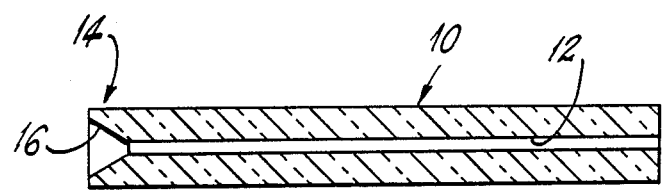
FIG. 1 is an elevational, sectional view of a capillary glass tube.
Figure 2:
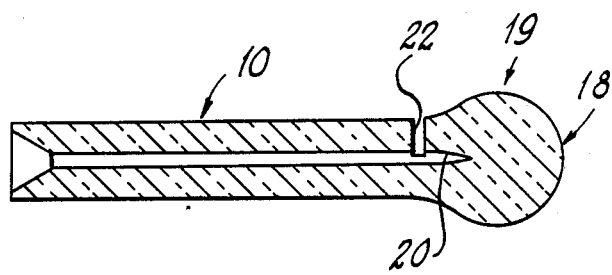
FIG. 2 is an elevational, sectional view of a lensed capillary.
Figure 3:
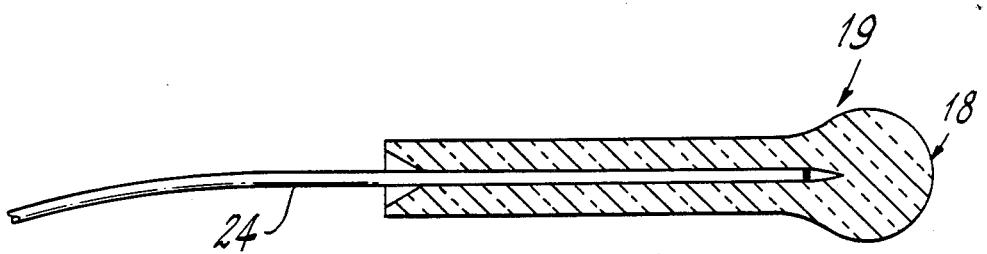
FIG. 3 is a view similar to FIG. 2 with a fiber in place.

Referring now to the drawings with greater particularity, there is shown in FIG. 1 an elongated capillary glass tube 10 having a longitudinally located, i.e., axial, fiber receiving bore 12 therein. One end 14 of tube 12 can be provided with a funnel-shaped entrance portion 16.

A bulbous lens 18 is provided on the end of tube 10 opposite funnel-shaped portion 16 to form a lensed capillary 19.

The formation of the bulbous lens 18 closes off the part of bore 12 therein and provides a conical fiber aligning section 20 therein. A vent 22 is also provided, adjacent the conical section 20, to allow the escape of air when the fiber 24 and the index matching and/or adhesive are inserted therein. The vent 22 can be a drilled hole or can be a slot formed by a diamond saw.

Figure 4:
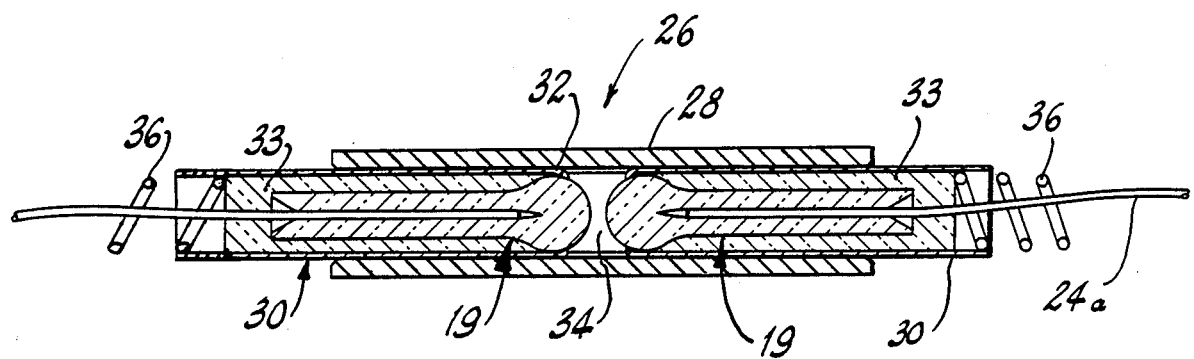
FIG. 4 is a sectional view of a pair of aligned lenses in a positioning housing.
Figure 5:
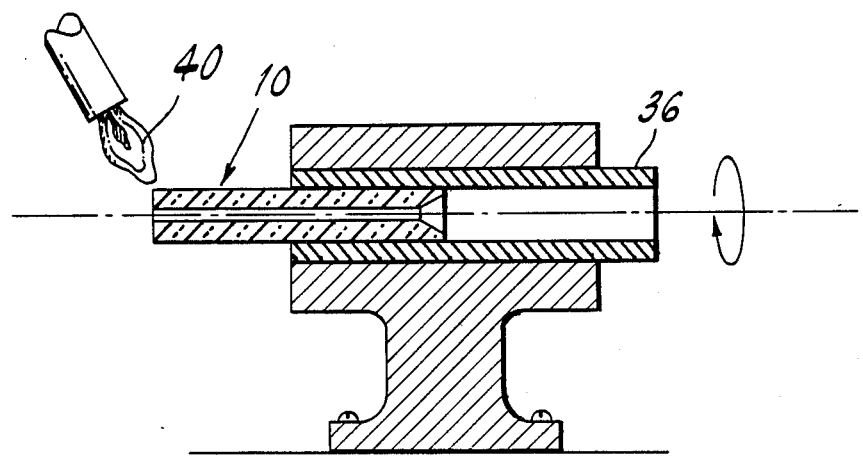
FIG. 5 is a diagrammatic representation of a method of making the lens.

When two fibers (24,24a) are to be joined, the intermediary of a connector 26 can be employed. Such a connector 26 is shown in FIG. 4 as comprising a pair of lensed capillaries 19 facing each other in a coupling sleeve 28.

Each of the lensed capillaries 19 is fixed into an alignment sleeve 30. The sleeves 30 have their inner ends 32 deformed to engage bulbous portion 18. The lensed capillaries 19 are fixed into alignment sleeves 30 by suitable means; e.g., an epoxy 33. The desired spacing of the lensed capillaries within coupling sleeve 28 is achieved by centrally located shim 34, against which the alignment sleeves butt, and compression springs 36, the free ends of which engage a housing wall, not shown.

The lensed capillaries 19 are preferably made by inserting a capillary tube 10 into a suitable spindle 36 and rotating the same while heating the exposed end of tube 10 to melt the same.

When the tube material is quartz, the spindle 36 is preferably rotated at from 150 to 200 rpm while a gas flame 40 raises the tube end temperature to a glass lens forming range of about 925° C. to 975° C.

The heat application time will be in the range of 15 to 20 seconds, as the centrifugal force generated by the rotating sprindle forms the molten glass into the bulbous portion 18.

A preferred gas for the heating step is a nitrous oxide, butane combination.

While there have been shown and described what are at present considered to be the preferred embodiments of the invention, it will be apparent to those skilled in the art that various changes and modifications can be made herein without departing from the scope of the invention as defined by the appended claims.

I claim:

1. An expanded beam lens for an optical fiber comprising: an elongated, capillary glass tube having a longitudinally located, fiber receiving bore terminating in an integral, bulbous portion.

2. The expanded beam lens of claim 1 wherein the end of said tube opposite said bulbous portion is formed as a fiber receiving funnel.

3. The expanded beam lens of claim 2 wherein said bore is substantially cylindrical for a major part of its length.

4. The expanded beam lens of claim 3 wherein said bore terminates in a cone adjacent said bulbous portion.

5. A method of making an expanded beam lens for an optical fiber comprising the steps of: forming an elongate glass capillary tube; mounting said tube in a spindle; rotating said spindle and said tube; and heating one end of tube to melt said glass and form a bulbous portion.

6. The method of claim 5 wherein said spindle is rotated at from 150 to 200 rpm.

7. The method of claim 5 wherein said tube is heated to a glass lens forming temperature of between about 925° C. to 975° C.

* * * * *